(12) United States Patent
Gu et al.

(10) Patent No.: US 10,778,024 B2
(45) Date of Patent: Sep. 15, 2020

(54) HYBRID ENERGY STORAGE SYSTEM WITH MULTIPLE ENERGY AND POWER DENSITIES

(71) Applicant: X Development LLC, Mountain View, CA (US)

(72) Inventors: Kaiwen Gu, Sunnyvale, CA (US); Matthew Nubbe, Santa Clara, CA (US)

(73) Assignee: WING Aviation LLC, Mountain View, CA (US)

(*) Notice: Subject to any disclaimer, the term of this patent is extended or adjusted under 35 U.S.C. 154(b) by 232 days.

(21) Appl. No.: 15/958,693

(22) Filed: Apr. 20, 2018

(65) Prior Publication Data

US 2019/0326764 A1    Oct. 24, 2019

(51) Int. Cl.
*H02J 7/00* (2006.01)
*B60R 16/033* (2006.01)

(52) U.S. Cl.
CPC .......... *H02J 7/0063* (2013.01); *B60R 16/033* (2013.01); *B64C 2201/066* (2013.01); *B64C 2201/108* (2013.01); *H02J 2007/0067* (2013.01)

(58) Field of Classification Search
CPC .... H02J 7/0063; H02J 2007/0067; H02J 7/00; H02J 2207/20; H02J 7/0065; B60R 16/033; B64C 2201/108; B64C 2201/066
See application file for complete search history.

(56) References Cited

U.S. PATENT DOCUMENTS

| | | | |
|---|---|---|---|
| 9,751,626 B2 | 9/2017 | Phan et al. | |
| 10,056,755 B2* | 8/2018 | Li | H02M 3/158 |
| 10,501,195 B2* | 12/2019 | Wang | H02M 3/156 |
| 2016/0221683 A1 | 8/2016 | Roberts et al. | |
| 2016/0236790 A1* | 8/2016 | Knapp | G08G 5/0021 |
| 2017/0072812 A1* | 3/2017 | Von Novak | B60L 53/20 |
| 2017/0203850 A1* | 7/2017 | Wang | B64C 39/024 |
| 2018/0364695 A1* | 12/2018 | Ponnarasseri | B64C 39/024 |

\* cited by examiner

*Primary Examiner* — Jared Fureman
*Assistant Examiner* — Emmanuel Dominique
(74) *Attorney, Agent, or Firm* — Christensen O'Connor Johnson Kindness PLLC

(57) ABSTRACT

A technique for power an apparatus during a mission includes powering the apparatus with a first energy storage device during a first mission segment of the mission. The first energy storage device has a first energy density and a first peak power rating. The apparatus is powered with a second energy storage device, distinct from the first energy storage device, during a second mission segment of the mission. The second energy storage device has a second energy density lower than the first energy density and a second peak power rating that is greater than the first peak power rating.

21 Claims, 6 Drawing Sheets

HYBRID ENERGY STORAGE SYSTEM WITH MULTIPLE ENERGY AND POWER DENSITIES

TECHNICAL FIELD

This disclosure relates generally to energy storage, and in particular but not exclusively, relates to battery technologies for autonomous vehicles.

BACKGROUND INFORMATION

In a typical energy storage system, such as a battery, power density and energy density are typically traded off against each other. A battery that is designed or optimized for energy density (e.g., endurance) typically has a high specific energy (W*h/kg) for storing a relatively high amount of energy for a given weight or volume. However, operating a battery designed for energy density at high output powers can result in damage or premature failure. A battery that is designed or optimized for power density (e.g., peak power performance) is capable of a high peak specific power (W/kg) delivery; however, batteries designed for peak power delivery typically are inefficient from a mass/volume perspective for endurance operations. Ragone Plots are often used to chart and compare the energy density (also referred to as specific energy) vs power density (also referred to as specific power) of energy storage systems. Often, the mission specification of a system calls for both high peak power and high energy endurance, though not necessarily simultaneously. An energy storage system that is capable of both high peak power and high specific energy during different phases of a mission of a system may be desirable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
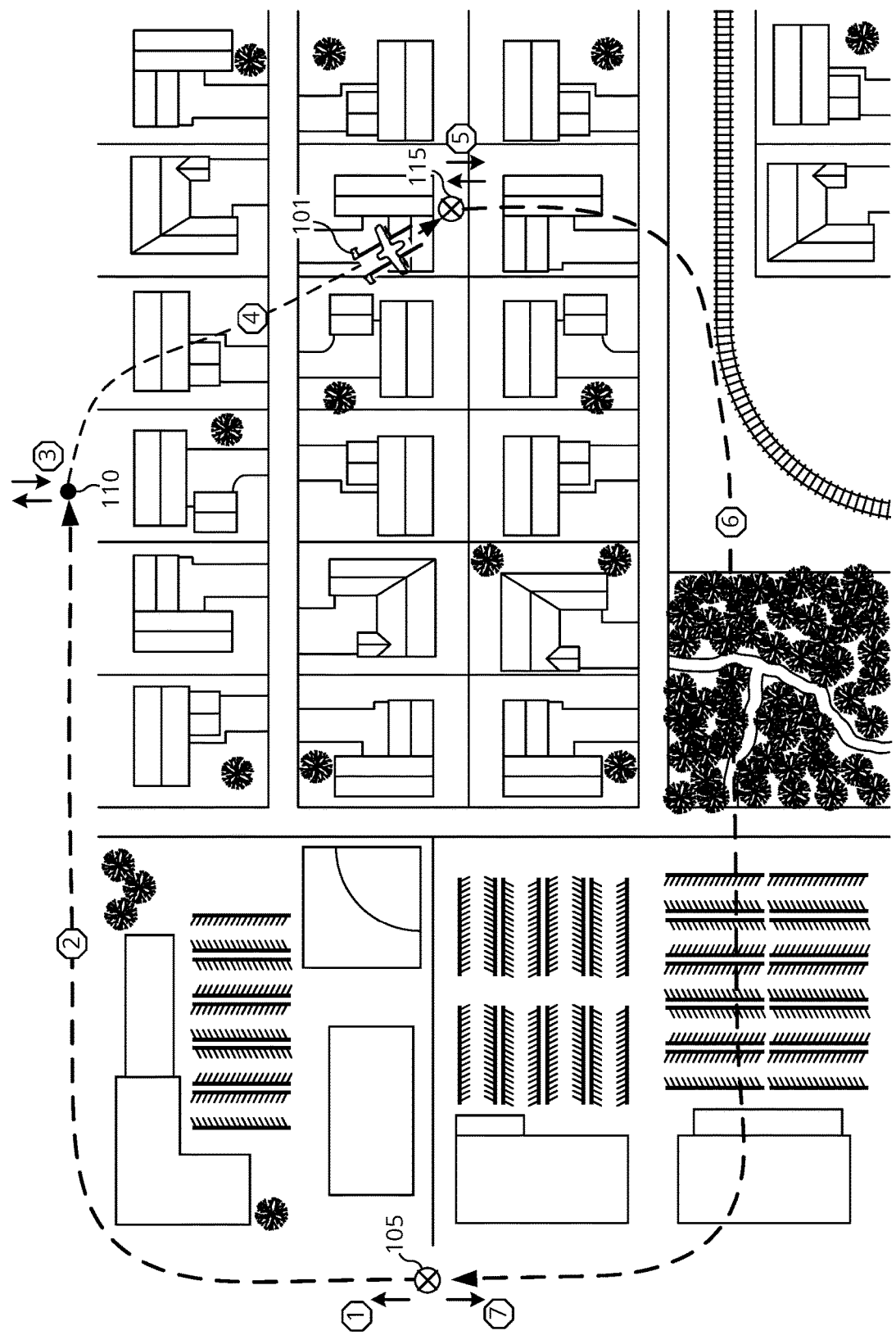
FIG. 1 illustrates an unmanned aerial vehicle having multiple mission segments each with a different power profile, in accordance with an embodiment of the disclosure.

Embodiments of a system, apparatus, and method for powering vehicles using multiple energy storage devices having different energy densities are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the technique disclosed herein use multiple energy storage devices, each having a different energy density and peak power rating, to power different segments of a mission of an apparatus or vehicle, such as an autonomous vehicle (AV). When different mission segments of an overall mission have different power profiles (e.g., require different total energies delivered at different peak powers), the use of a single energy storage device to power both mission segments can require wasted overhead in the design of the energy storage device. In contrast, embodiments described herein include multiple different energy storage devices each optimized for the demand characteristics of each mission segment. Having hybrid (dual or multiple) energy storage devices (e.g., batteries, capacitors, fuel cells, etc.) with different energy densities and peak power ratings can reduce overall weight of the total energy storage system while achieving peak power bursts that would otherwise damage a monolithic/unitary energy storage system. For example, in the case of an unmanned aerial vehicle (UAV), two distinct batteries may be used, a lower capacity, higher peak power rated hover battery for powering hover motors that provide vertical propulsion, and a high capacity, lower peak power rated cruise battery for powering cruise motors that provide horizontal propulsion.

In energy storage systems, power density and energy density are typically traded off against each other. Conventional Ragone plots, which illustrate peak power (W/kg) vs specific energy (W*h/kg), illustrate how power density and energy density for various monolithic/unitary energy storage systems are inversely related. Unitary energy storage systems with high energy density are typically rated for lower peak power delivery while unitary energy storage systems rated for higher peak power typically have lower energy densities.

It can be desirable for a given system or vehicle to have both high peak power and high specific energy needs, though not simultaneously. Indeed, the typical load profile for cars in city use, short range aircraft, and vertical takeoff and land (VTOL) UAVs have this common characteristic. Meeting both of these energy density and peak power requirements with a monolithic energy storage solution typically involves system level compromises. On aerial vehicles (and particularly VTOL UAVs), overall vehicle weight and payload capacity suffer.

Although the embodiments illustrated herein describe embodiments of a hybrid energy storage system in the context of a UAV, it should be appreciated that these principles are equally applicable to other vehicle types (either manned or autonomous), whether land, aerial, or water based and even other types of non-vehicular apparatuses. For example, the hybrid energy storage systems described herein may also be used in consumer electronic devices such as laptops, cellphones, etc. Of course, a hybrid energy storage system with multiple power and energy densities is particularly well suited for AVs with well-defined missions having different mission segments with unique power profiles.

FIG. 1 illustrates a VTOL UAV 101 having multiple mission segments each with a different power profile, in accordance with an embodiment of the disclosure. In the illustrated embodiment, UAV 101 has a mission wherein it launches vertically from a nest location 105 and rises to its cruising altitude (mission segment 1: hover profile), cruises to a waypoint 110 (mission segment 2: cruise profile), descends vertically to acquire a package and then ascends vertically back to its cruising altitude (mission segment 3: hover profile), cruises to a delivery destination 115 (mission segment 4: cruise profile), descends vertically to deliver the package and then ascends vertically back to its cruising altitude (mission segment 5: hover profile), cruises back to nest location 105 (mission segment 6: cruise profile), and descends for a landing at nest location 105 (mission segment 7: hover). The hover mission segments are characterized by short durations of relative high peak power consumption while UAV 101 hovers at a constant altitude, ascends, or descends. In contrast, the cruise mission segments are characterized by longer durations of relative lower peak power consumption. However, the total energy consumption of the cruise mission segments is typically much larger than the total energy consumption of the hover mission segments. Furthermore, the high peak power hover mission segments are separated or broken up by the longer durations of the lower peak power cruise mission segments.

Figure 2:
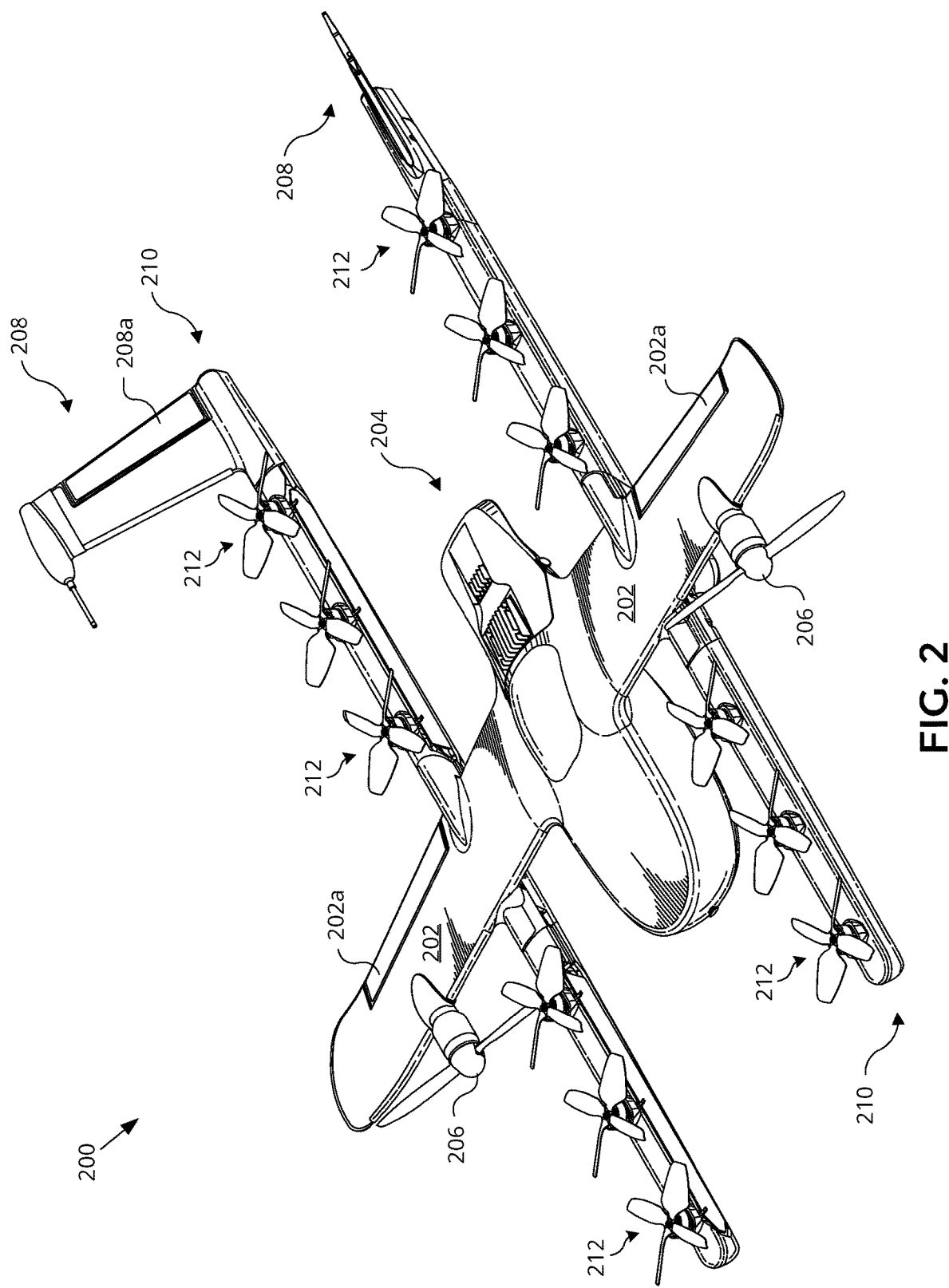
FIG. 2 is a perspective view illustration of a demonstrative unmanned aerial vehicle having hover rotors and cruise rotors used during different mission segments, in accordance with an embodiment of the disclosure.

FIG. 2 is a perspective view illustration of a demonstrative UAV 200, according to an embodiment of the disclosure. UAV 200 is one possible implementation of UAV 101 illustrated in FIG. 1. UAV 200 is a fixed-wing UAV, which as the name implies, has a wing assembly 202 that can generate lift based on the wing shape and the vehicle's forward airspeed when propelled horizontally by cruise rotors 206. For instance, wing assembly 202 may have an airfoil-shaped cross section to produce an aerodynamic lift force on the UAV 200. The illustrated embodiment of UAV 200 is also a VTOL UAV, which includes hover rotors 212 to provide vertical propulsion.

The illustrated embodiment of UAV 200 includes a fuselage 204. In one embodiment, fuselage 204 is modular and includes a battery module, an avionics module, a mission payload module, and a fuselage cover. These modules may be detachable from each other and mechanically securable to each other to contiguously form at least a portion of the fuselage or UAV main body.

The battery module includes a cavity for housing two or more batteries of a hybrid energy storage system, as described herein, for powering UAV 200. The avionics module houses flight control circuitry of UAV 200, which may include a processor and memory, communication electronics and antennas (e.g., cellular transceiver, wifi transceiver, etc.), and various sensors (e.g., global positioning sensor, an inertial measurement unit (IMU), a magnetic compass, etc.). The mission payload module houses equipment associated with a mission of UAV 200. For example, the mission payload module may include a payload actuator for holding and releasing an externally attached payload. In another embodiment, the mission payload module may include a camera/sensor equipment holder for carrying camera/sensor equipment (e.g., camera, lenses, radar, lidar, pollution monitoring sensors, weather monitoring sensors, etc.). In yet another embodiment, the mission payload module may include an additional battery holder to house additional or larger batteries for extended flight times. Of course, the mission payload module may provide mixed use payload capacity (e.g., additional battery and camera equipment) for a variety of mix-use missions.

As illustrated, UAV 200 includes cruise rotors 206 positioned on wing assembly 202, which can each include a motor, shaft, and propeller, for propelling UAV 200 horizontally. The illustrated embodiment of UAV 200 further includes two boom assemblies 210 that secure to wing assembly 202. Hover rotors 212 are mounted to boom assemblies 210. Hover rotors 212 can each include a motor, shaft, and propeller, for providing vertical propulsion. Vertical propulsion units 212 may be used during a hover mode where UAV 200 is descending (e.g., to a delivery location), ascending (e.g., following a delivery), or maintaining a constant altitude. Stabilizers 208 (or tails) may be included with UAV 200 to control pitch and stabilize the UAV's yaw (left or right turns) during cruise. In some embodiments, during cruise mode hover rotors 212 are disabled and during hover mode cruise rotors 206 are disabled. In other embodiments, hover rotors 212 are merely powered low during cruise mode and/or cruise rotors 206 are merely powered low during hover mode.

During flight, UAV 200 may control the direction and/or speed of its movement by controlling its pitch, roll, yaw, and/or altitude. Thrust from cruise rotors 206 is used to control air speed. For example, the stabilizers 208 may include one or more rudders 208a for controlling the UAV's yaw, and wing assembly 202 may include elevators for controlling the UAV's pitch and/or ailerons 202a for controlling the UAV's roll. As another example, increasing or decreasing the speed of all the propellers simultaneously can result in UAV 200 increasing or decreasing its altitude, respectively.

Many variations on the illustrated fixed-wing UAV are possible. For instance, fixed-wing UAVs may include more or fewer propellers, and/or may utilize a ducted fan or multiple ducted fans for propulsion. Further, UAVs with more wings (e.g., an "x-wing" configuration with four wings), are also possible. Although FIG. 2 illustrates one wing assembly 202, two boom assemblies 210, two forward propulsion units 206, and six vertical propulsion units 212 per boom assembly 210, it should be appreciated that other variants of UAV 200 may be implemented with more or less of these components.

Furthermore, the hybrid energy storage systems described herein may be used with other types of UAVs, manned or unmanned vehicles in general, or otherwise. Although the hybrid energy storage system described herein is designed to reduce mass in UAV 200, embodiments of the hybrid energy storage system may be designed to improve or optimize other system level metrics. For example, hybrid energy storage systems may be implemented into consumer electronic devices, such as cell phones, laptops, etc. to power different mission segments (e.g., use cases, operating modes, power profiles, etc.) of the device. As monolithic battery systems age, they often cannot provide sufficient instantaneous power to support full speed operations. As such, the speed of an aging device is sometimes throttled. The inclusion of a hybrid energy storage system, as described herein, may be used to ameliorate the effects of aging on a monolithic battery system where the different mission segments of the device correspond to aging phases of the device. Other system level metrics that may be optimized using a hybrid energy storage system include cost, volume/physical size, physical form factor, etc. Volume/physical size is commonly a deciding factor in a small consumer electronic device, such as a cellular phone, whereas cost (or per cycle cost) is often a relevant factor in more stationary applications.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

Figure 3A:
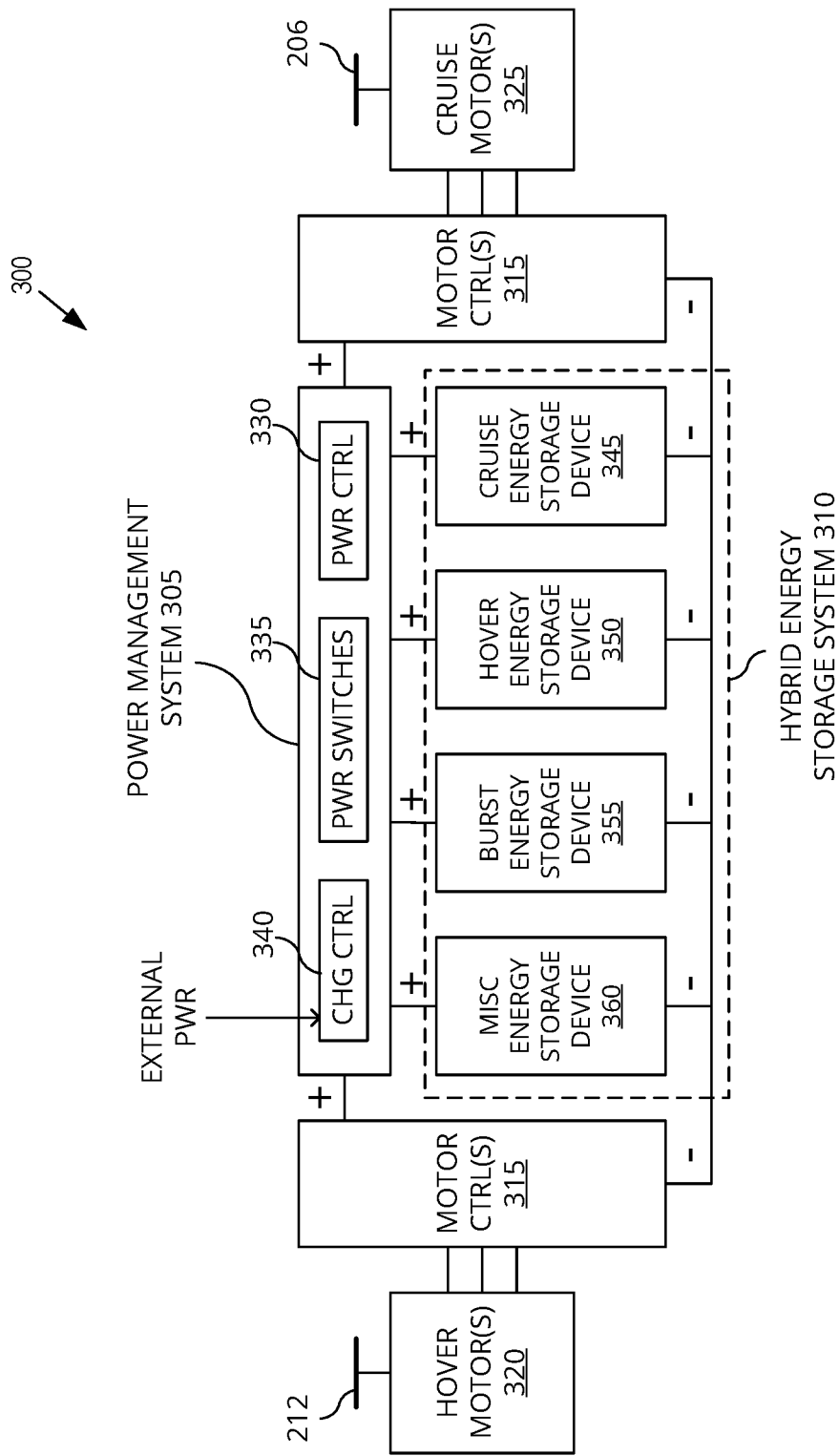
FIG. 3A is a functional block diagram illustrating power and propulsion systems of a vehicle, in accordance with an embodiment of the disclosure.

FIG. 3A is a functional block diagram illustrating power and propulsion systems 300 of UAV 200, in accordance with an embodiment of the disclosure. The illustrated embodiment includes a power management system 305, a hybrid energy storage system 310, motor controllers 315, hover motors 320 for driving hover rotors 212 and cruise motors 325 for driving cruise rotors 206. The illustrated embodiment of power management system 305 includes a power controller 330, power switches 335, and a charge controller 340. The illustrated embodiment of hybrid energy storage system 310 includes a cruise energy storage device 345, a hover energy storage device 350, a burst energy storage device 355, and a miscellaneous energy storage device 360. Although systems 300 are described in the context of an aerial vehicle, it should be appreciated that power management system 305 and hybrid energy storage system 310 are equally applicable to other vehicle types (land, air, or water) as well as other electrical systems that operate using two or more distinct power profiles or "mission segments."

The hybrid energy storage system 310 includes multiple distinct energy storage devices each designed and optimized for a different mission segment having a different power profile. For example, cruise energy storage device 345 may be designed to have a higher energy density, but a lower peak power rating (or lower specific power rating) for endurance segments of a mission (e.g., cruise segments 2, 4, and 6 in FIG. 1). Correspondingly, hover energy storage device 350 may be designed to have a lower energy density but higher peak power rating (or higher specific power rating) for power segments of the mission (e.g., hover segments 1, 3, 5, and 7). Similarly, burst energy storage device 355 may be designed to have an even higher peak power rating for burst powering the propulsion units, but hold a relative smaller total amount of energy relative to cruise energy storage device 345 and hover energy storage device 350. Burst powering may be used regain navigation control in the event of unexpected environmental forces (e.g., wind gusts, etc.) or mitigate a loss of navigation control to slow or direct a crash descent. Finally, miscellaneous energy storage device 360 is illustrated to represent that any number of energy storage devices may be included in hybrid energy storage system 310 to power any number of distinct mission segments having unique power profiles or demands. It should be appreciated, that in some embodiments, only two distinct energy storage devices may be included.

A further advantage of using multiple distinct energy storage devices, as opposed to a monolithic device, is the availability of failover redundancy. Even though each energy storage is designed and optimized for a particular mission segment, the power of the other energy storage devices may still be accessed in times of failure to navigate the UAV 200 to a safe landing zone or return it to nest location 105, even though doing so may ultimately damage the failover device to achieve the greater good of safely returning UAV 200.

The energy storage devices 345-360 may be implemented using a variety of different energy storage technologies. In one embodiment, hover energy storage device 350 and cruise energy storage device 345 are implemented using distinct battery technologies designed for their specific mission segments. For example, hover energy storage device 350 may have a LiFePO$_4$ battery chemistry while cruise energy storage device 345 may have a LiCoO$_2$ or NMC battery chemistry. Of course, other Li-ion battery types may also be used. In one embodiment, burst energy storage device 355 may be implemented using one or more capacitors, such as super-capacitors, that are capable of high current bursts. Miscellaneous energy storage device 360 may represent any other type of energy storage device including fuel cells, fossil fuels (e.g., gas, diesel, propane, natural gas, liquefied natural gas (LNG), or otherwise.

During operation, power management system 305 operates to couple the correct energy storage device to the correct propulsion unit (e.g., hover motor(s) 320 or cruise motor(s) 325) through motor controllers 315 depending upon the current mission segment. Motor controllers 315 operate to control the thrust or torque generated by hover motor(s) 320 and cruise motor(s) 325. In one embodiment, motor controllers 315 are implemented with electronic speed controllers (ESCs).

Figure 3B:
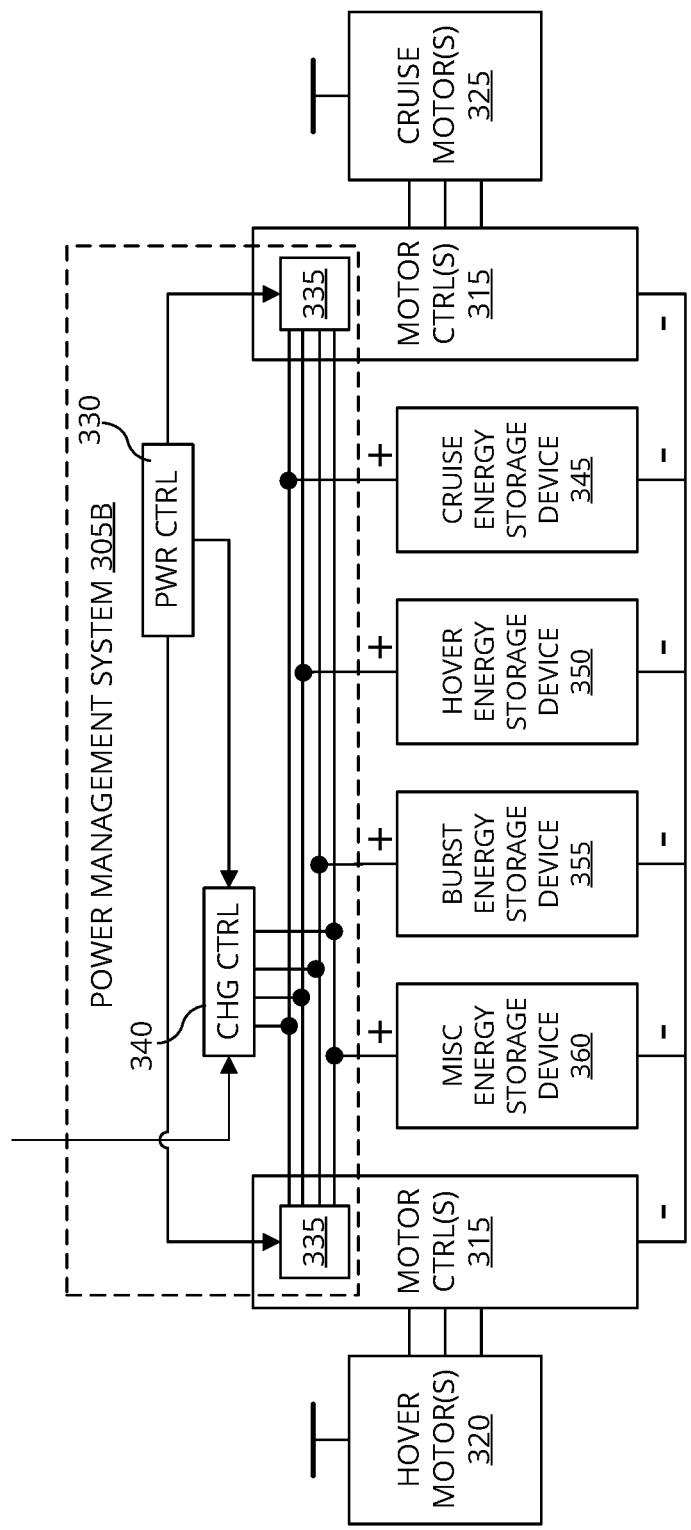
FIG. 3B is a functional block diagram illustrating power and propulsion systems of a vehicle, in accordance with another embodiment of the disclosure.

Power management system 305 includes power switches 335, which selectively couple energy storage devices 345-360 to the propulsion units. Power switches 335 may be centrally located in a power switching hub, as illustrated in FIG. 3A. Alternatively, power switches 335 of power management system 305B (see FIG. 3B) are decentralized/distributed with switches located within motor controllers 315, charge controller 340, and/or hybrid energy storage system 310. In yet other embodiments, the battery voltages of the energy storage devices may be tightly matched and the positive terminals coupled directly to each other (not illustrated). In embodiments where the battery voltages of each energy storage device 345-360 are not tightly matched power management system 305 may include one or more DC-to-DC power converters for transferring power between the various energy storage devices or for coupling the energy storage devices to the various loads (e.g., hover motors 320 or cruise motors 325).

Power switches 335 are switched under the influence of power controller 330. Power controller 330 includes logic that when executed orchestrates the operation of power management system 305, including power switches 335.

The logic of power controller 330 may be implemented in software/firmware with instructions stored to a memory unit coupled to be executed by a general purpose microcontroller, may be implemented in hardware (e.g., application specific integrated circuit, field programmable gate array, etc.), or implemented in a combination of software and hardware components. In some embodiments, the above mentioned DC-to-DC power converter may be included within power controller 330.

The illustrated embodiment of power management system 305 further includes charge controller 340. In one embodiment, charge controller 340 is coupled to hybrid energy storage system 310 to recharge energy storage devices 345-360 after completion of the mission via an externally coupled power source. Accordingly, in one embodiment, charge controller 340 may include an AC-to-DC power converter. In one embodiment, charge controller 340 is also coupled to hybrid energy storage system 310 to transfer charge between energy storage devices 345-360 on an as needed basis. For example, charge controller 340 may be operated to recharge hover energy storage device 350 with cruise energy storage device 345. In these embodiments, charge controller 340 may include one or more DC-to-DC power converters.

Increasing the storage capacity of cruise energy storage device 345 to store energy for both the hover and cruise mission segments can save weight and volume within UAV 200 given its higher energy density. Since hover mission segments typically have short durations separated by much longer duration cruise mission segments, charge controller 340 can use the cruise mission segments to transfer energy back to a partially depleted hover energy storage device 350 in preparation for the next hover mission segment. In some embodiments, hover energy storage device 350 may be downsized in favor of upsizing cruise energy storage device 345 to save weight and volume within UAV 200. Intra-mission charge transfers from cruise energy storage device 345 may be used to extend the useable life of hover energy storage device 350 over a given mission. The high power rated devices, such as hover energy storage device 350, may be intentionally undersized such that they cannot store enough energy to complete all of their corresponding mission segments of a given mission, but rather rely upon intra-mission charge transfers from one or more of the other energy storage devices having a higher energy density. In one embodiment, hover energy storage device 350 is sized such that it is capable of powering one of its highest energy consumption hover segments (e.g., hover segments 3 or 5) with some overhead, but insufficiently sized to power all hover segments or multiple hover segments without intra-mission charge transfers during the cruise segments.

In yet other embodiments, power controller 330 may continuously couple cruise energy storage device 345 to either hover motors 320 and/or cruise motors 325 throughout the entire mission including not just cruise segments but also hover segments even when cruise motors 325 are not operating. However, during the hover segments when hover motors 320 are operating and drawing a higher current/peak power than cruise energy storage device 345 is rated to supply, power controller 330 may configure power switches 335 to also draw additional power from hover energy storage device 350 to supply the overload power needs. Thus, in one embodiment, cruise motors 325 are only powered by cruise energy storage device 345 but hover motors 320 may be powered by both cruise energy storage device 345 and hover energy storage device 350. Continuously operating the energy storage device having the greatest energy density at or near it's rated peak power throughout the entire mission can optimize the energy storage efficiency of hybrid energy storage system 310.

Figure 4:
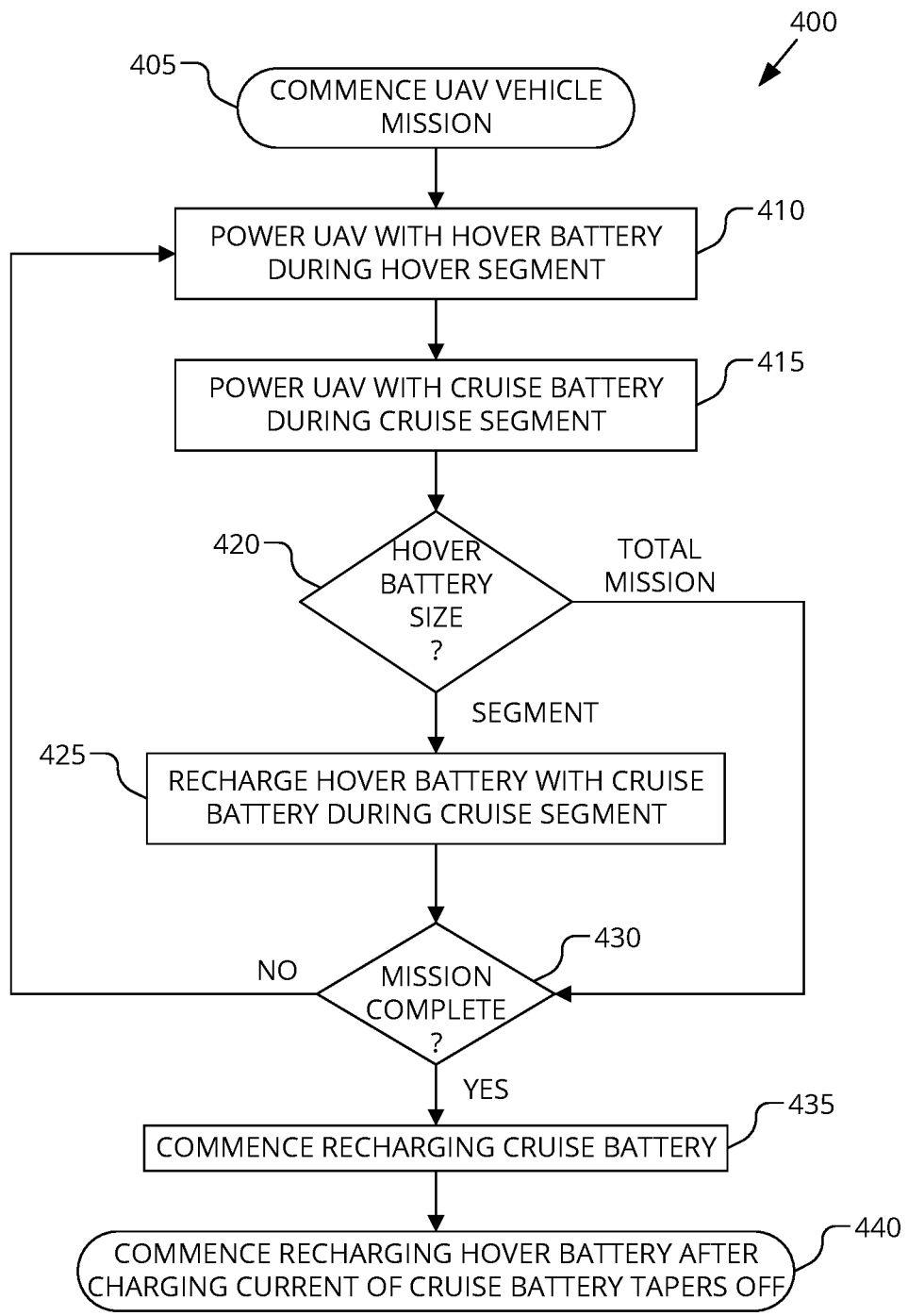
FIG. 4 is a flow chart illustrating a process for powering a vehicle during a mission having multiple mission segments each with a different power profile using multiple energy storage devices, in accordance with an embodiment of the disclosure.

FIG. 4 is a flow chart illustrating a process 400 for powering a vehicle during a mission having multiple mission segments each with a different power profile using multiple energy storage devices, in accordance with an embodiment of the disclosure. Process 400 is described with reference to UAV 200; however, it is applicable to aerial and non-aerial vehicles alike, both manned and autonomous. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, the mission of UAV 200 is commenced by powering up UAV 200. UAV 200 commences its mission with a hover segment by ascending to a cruising altitude. In a process block 410, power management system 305 uses a hover battery (e.g., hover energy storage device 350) to power hover rotors 212 during the hover segment. Once at cruise altitude, UAV 200 begins a transition to a cruise mode where power management system 305 powers up cruise rotors 206 with a cruise battery (e.g., cruise energy storage device 350) and hover rotors 212 are powered down (process block 415). During process block 415, UAV 200 cruises to its next destination (e.g., waypoint 110, delivery destination 115, etc.).

If the hover battery is sized to power all hover segments of the mission (decision block 420), then process 400 continues to a process block 430. However, if hover battery is not sufficiently sized to power all hover segments of the mission (decision block 420), then power controller 340 commences recharge of the hover battery from the cruise battery while UAV 200 is operating in the cruise segment (process block 425).

Figure 5:
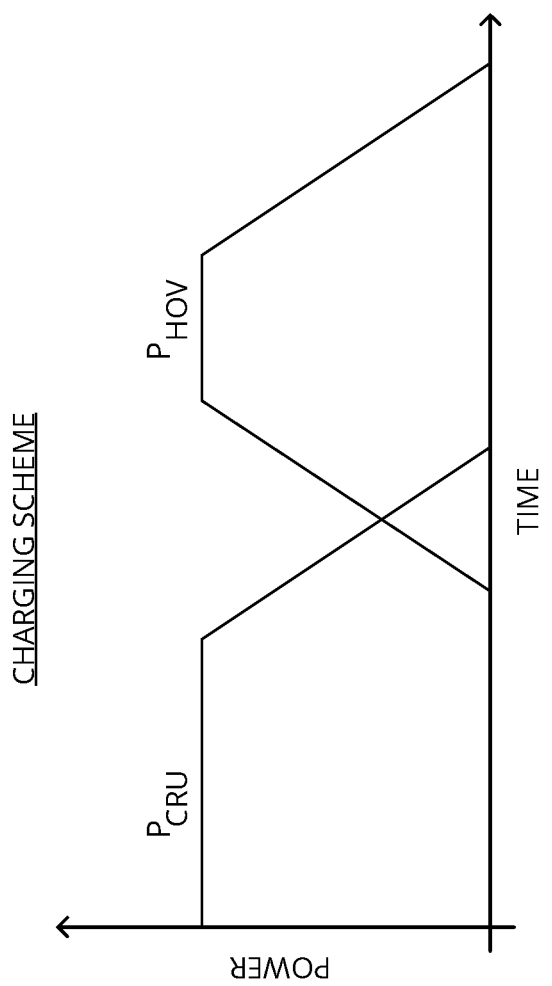
FIG. 5 is a chart illustrating charging curves of a cruise battery and a hover battery of an unmanned aerial vehicle, in accordance with an embodiment of the disclosure.

If the mission includes several alternating instances of cruise segments separated by hover segments (decision block 430), then process 400 loops back to process block 410 to perform the additional mission segments. Upon completion of the mission (decision block 430) and returning UAV 200 to nest location 105, charge controller 340 may be plugged into an external power source for recharging. In a process block 435, charge controller 340 commences recharging the larger cruise battery having the higher energy density first. In a process block 440, charge controller 340 commences charging of the smaller, higher power hover battery, once the charge level of the cruise battery reaches a charge level that causes the charging current into the cruise battery to taper off from the peak charging current. FIG. 5 is a chart illustrating this efficient charging scheme for cruise energy storage device 345 and hover energy storage device 350 using charge controller 340, in accordance with an embodiment of the disclosure. By offsetting the charging curves $P_{CRU}$ and $P_{HOV}$ for the cruise and hover batteries, respectively, charge controller 340 can be downsized to reduce overall weight and cost. In one embodiment, the single charge controller 340 is used to charge both cruise and hover energy storage devices 345, 350 but is insufficiently sized to simultaneously charge both energy storage devices at their respective peak charging currents.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of powering an aerial vehicle during a mission of the aerial vehicle, the method comprising:
   powering the aerial vehicle with a first energy storage device during a first mission segment of the mission, wherein the first energy storage device has a first energy density and a first peak power rating;
   powering the aerial vehicle with a second energy storage device, distinct from the first energy storage device, during a second mission segment of the mission, wherein the second energy storage device has a second energy density lower than the first energy density and a second peak power rating, wherein the first mission segment comprises a cruise segment, the second mission segment comprises a first hover segment, and the mission includes a second hover segment;
   at least partially depleting the second energy storage device during the first hover segment; and
   recharging the second energy storage device with the first energy storage device while the aerial vehicle is flying during the cruise segment between the first hover segment and the second hover segment.

2. The method of claim 1, wherein powering the aerial vehicle includes powering propulsion of the aerial vehicle, wherein the second peak power rating is greater than the first peak power rating, and wherein the second mission segment requires greater peak power for propelling the aerial vehicle than the first mission segment.

3. The method of claim 2, wherein the first mission segment consumes more total energy than the second mission segment.

4. The method of claim 2, wherein a first total energy storage and the first peak power rating of the first energy storage device are optimized for the first mission segment, and a second total energy storage and the second peak power rating of the second energy storage device are separately optimized for the second mission segment.

5. The method of claim 2, wherein the aerial vehicle comprises an unmanned aerial vehicle (UAV), the first energy storage device comprises a cruise battery, and the second energy storage device comprises a hover battery.

6. The method of claim 5, wherein at least partially depleting the hover battery during the first hover segment comprises depleting the hover battery during the first hover segment to a first charge level that renders the hover battery insufficiently charged to complete the second hover segment, and
   wherein recharging the hover battery with the cruise battery while the UAV is flying during the cruise segment comprises recharging the hover battery during the cruise segment from the first charge level to a second charge level that is sufficient to complete the second hover segment, wherein the hover battery is insufficiently sized to hold enough power to complete all hover segments of the mission without recharging from the cruise battery during the cruise segment.

7. The method of claim 5, wherein:
   powering propulsion of the aerial vehicle with the first energy storage device during the first mission segment comprises powering one or more cruise rotors mounted for horizontal propulsion during the cruise segment with just the cruise battery, and
   powering the aerial vehicle with the second energy storage device during the second mission segment comprises powering one or more hover rotors mounted for vertical propulsion during the first hover segment with just the hover battery, wherein the hover rotors are separate and distinct from the cruise rotors.

8. The method of claim 7, wherein:
   powering the one or more cruise rotors during the cruise segment comprises powering the one or more cruise rotors only with the cruise battery, and
   powering the one or more hover rotors during the first hover segment comprises powering the one or more hover rotors with both the hover battery and the cruise battery.

9. The method of claim 2, further comprising:
   burst powering propulsion of the vehicle with a third energy storage device, distinct from the first and second energy storage devices, to achieve one or more propulsion bursts that regain navigation control or that mitigate a loss of navigation control.

10. The method of claim 9, wherein the third energy storage device comprises one or more capacitors and wherein the one or more capacitors are coupled to one or both of the first or second energy storage devices for recharging after the burst powering of the propulsion of the vehicle.

11. The method of claim 1, further comprising:
   commencing recharging of the first energy storage device, after completion of the mission; and
   commencing recharging of the second energy storage device after the first energy storage device has reached a charge level that causes a charging current into the first energy storage device to taper off from a peak charging current,
   wherein the first and second energy storage devices are charged with a single charge controller that is insufficiently sized to simultaneously charge both the first and second energy storage devices at their respective peak charging currents.

12. An autonomous vehicle, comprising:
   one or more sources of propulsion coupled to provide propulsion to the autonomous vehicle;

a first energy storage device having a first energy density and a first peak power rating;

a second energy storage device, distinct from the first energy storage device, having a second energy density lower than the first energy density and a second peak power rating that is greater than the first peak power rating;

a power management system adapted to couple one or more of the sources of propulsion to the first energy storage device during a first mission segment of a mission of the autonomous vehicle and to couple one or more of the sources of propulsion to the second energy storage device during a second mission segment of the mission, wherein the first mission segment comprises a cruise segment, the second mission segment comprises a first hover segment, and the mission further includes a second hover segment separated from the first hover segment by the cruise segment, and wherein the power management system includes logic, that when executed by the power management system, causes the autonomous vehicle to perform operations including:

at least partially depleting the second energy storage device during the first hover segment; and recharging the second energy storage device with the first energy storage device while the autonomous vehicle is flying during the cruise segment.

13. The autonomous vehicle of claim 12, wherein a first total energy storage and the first peak power rating of the first energy storage device are optimized for the first mission segment and a second total energy storage and the second peak power rating of the second energy storage device are separately optimized for the second mission segment.

14. The autonomous vehicle of claim 13, wherein the second mission segment requires greater peak power for propelling the vehicle than the first mission segment and the first mission segment consumes more total energy than the second mission segment.

15. The autonomous vehicle of claim 12, wherein the power management system, comprises:

one or more power switches coupled between the one or more sources of propulsion and the first or second energy storage devices; and a power controller coupled to the one or more power switches and including logic to selectively enable or disable the one or more power switches depending upon whether the autonomous vehicle is executing the first mission segment or the second mission segment.

16. The autonomous vehicle of claim 12, wherein the autonomous vehicle comprises an unmanned aerial vehicle (UAV), the first energy storage device comprises a cruise battery, and the second energy storage device comprises a hover battery.

17. The autonomous vehicle of claim 16, wherein at least partially depleting the hover battery during the first hover segment comprises depleting the hover battery during the first hover segment to a first charge level that renders the hover battery insufficiently charged to complete the second hover segment, and wherein recharging the hover battery with the cruise battery while the UAV is flying during the cruise segment comprises recharging the hover battery during the cruise segment from the first charge level to a second charge level that is sufficient to complete the second hover segment.

18. The autonomous vehicle of claim 16, wherein the one or more sources of propulsion includes one or more cruise rotors mounted for horizontal propulsion and one or more hover rotors mounted for vertical propulsion, and wherein the power management system includes logic, that when executed by the power management system, causes the autonomous vehicle to perform operations including:

powering the one or more cruise rotors during the cruise segment with the cruise battery, and powering the one or more hover rotors during the first hover segment with the hover battery.

19. The autonomous vehicle of claim 18, wherein:

powering the one or more cruise rotors during the cruise segment comprises powering the one or more cruise rotors only with the cruise battery, and powering the one or more hover rotors during the first hover segment comprises powering the one or more hover rotors with both the hover battery and the cruise battery.

20. The autonomous vehicle of claim 12, further comprising:

a third energy storage device, distinct from the first and second energy storage devices, wherein the power management system temporarily couples the third energy storage device to the one or more sources of propulsion to provide a propulsion burst that regains navigation control or that mitigates a loss of navigation control.

21. The autonomous vehicle of claim 12, further comprising:

a charge controller coupled to the first and second energy storage devices to control charging of the first and second energy storage devices, wherein the charge controller includes logic, that when executed by the charge controller, causes the autonomous vehicle to perform operations including:

commencing recharging of the first energy storage device, after completion of the mission; and commencing recharging of the second energy storage device after the first energy storage device has reached a charge level that causes a charging current into the first energy storage device to taper off from a peak charging current, wherein the charge controller is insufficiently sized to simultaneously charge both the first and second energy storage devices at their respective peak charging currents.

* * * * *